United States Patent [19]

Castner

[11] Patent Number: 5,448,002
[45] Date of Patent: Sep. 5, 1995

[54] SYNTHESIS OF TRANS-1,4-POLYBUTADIENE HAVING CONTROLLED MOLECULAR WEIGHT

[75] Inventor: Kenneth F. Castner, Uniontown, Ohio

[73] Assignee: The Goodyear Tire & Rubber Company, Akron, Ohio

[21] Appl. No.: 289,977

[22] Filed: Aug. 12, 1994

[51] Int. Cl.$^6$ ............................ C08F 4/70; C08F 36/06
[52] U.S. Cl. .................................. 526/140; 526/142; 526/169.1; 526/335; 526/348.6
[58] Field of Search ................... 526/335, 340.4, 140, 526/348.6

[56] References Cited

U.S. PATENT DOCUMENTS

| | | | |
|---|---|---|---|
| 3,607,841 | 9/1971 | Nakahara | 528/355 |
| 4,517,349 | 5/1985 | Fujiwara | 526/313 |
| 4,933,400 | 6/1990 | Jarvis | 526/65 |
| 4,988,781 | 1/1991 | McKinney | 526/68 |
| 5,089,574 | 2/1992 | Castner | 526/142 |

*Primary Examiner*—Fred Zitomer
*Attorney, Agent, or Firm*—Alvin T. Rockhill

[57] ABSTRACT

Trans-1,4-polybutadiene is normally synthesized utilizing transition metal or rare earth catalysts. However, molecular weight control is difficult to achieve with such catalysts and the molecular weight of the polymer produced is frequently much higher than desired. By utilizing the catalyst system and techniques of this invention, trans-1,4-polybutadiene can be synthesized continuously to a high level of conversion with molecular weight control being possible. This invention specifically relates to a process for synthesizing trans-1,4-polybutadiene by polymerizing 1,3-butadiene monomer in the presence of a catalyst system which is comprised of an organocobalt compound, an organoaluminum compound and a para-substituted phenol with molecular weight being controlled by conducting the polymerization in the presence of at least one dialkyl sulfoxide, diaryl sulfoxide or dialkaryl sulfoxide. Such polymerizations can be conducted on a batch or a continuous basis. In the case of continuous processes, it is normally desirable to conduct the polymerization in the presence of carbon disulfide as a gel inhibitor.

22 Claims, No Drawings

SYNTHESIS OF TRANS-1,4-POLYBUTADIENE HAVING CONTROLLED MOLECULAR WEIGHT

BACKGROUND OF THE INVENTION

By virtue of its high level of crystallinity, trans-1,4-polybutadiene (TPBD) is a thermoplastic resin. Because it contains many double bonds in its polymeric backbone, TPBD can be blended and cocured with rubber. TPBD is similar to syndiotactic-1,2-polybutadiene in this respect. Even though the trans-1,4-polybutadiene of this invention is a thermoplastic resin, it becomes elastomeric when cured alone or when cocured with one or more rubbers.

Good molecular weight control can normally be achieved by utilizing an anionic polymerization system to produce TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations" Academic Press, New York, 1979 Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80% trans-1,4-structure and 20 to 25% 1,2-structure. The catalyst system described by this reference consists of a cobalt compound having a cobalt organic acid salt or organic ligand, an organoaluminum compound and phenol or naphthol. Gel formation is a serious problem which is frequently encountered when this three component catalyst system is utilized in the synthesis of TPBD. Gelation is a particularly serious problem in continuous polymerizations. By utilizing the catalyst system and techniques of this invention, TPBD can be synthesized in a continuous process with only minimal amounts of gel formation.

U.S. Pat. No. 5,089,574 is based upon the unexpected finding that carbon disulfide will act as a gel inhibitor in conjunction with three component catalyst systems which contain an organocobalt compound, an organoaluminum compound and a para-alkyl substituted phenol. U.S. Pat. No. 5,089,574 also indicates that conversions can be substantially improved by utilizing para-alkyl substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide, and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

The techniques described in U.S. Pat. No. 5,089,574 are very useful in improving conversions and reducing gel formation. However, its teachings do not describe a technique for controlling the molecular weight of the TPBD being synthesized. In many applications, it would be desirable for the TPBD produced to have a lower molecular weight. There is, accordingly, a need to control the molecular weight of the TPBD produced with such ZieglerºNatta catalyst systems.

SUMMARY OF THE INVENTION

The techniques of this invention allow for TPBD of controlled molecular weight to be produced with catalyst systems which contain an organocobalt compound, an organoaluminum compound and a para-substituted phenol. The techniques of this invention are based upon the unexpected finding that dialkyl sulfoxides, diaryl sulfoxides and dialkaryl sulfoxides act as molecular weight regulators when utilized in conjunction with such catalyst systems in the polymerization of 1,3-butadiene monomer into TPBD. It has been found that the molecular weight of the polymer produced decreases with increasing levels of the dialkyl sulfoxide, diaryl sulfoxide or dialkaryl sulfoxide present as a molecular weight regulator.

The subject invention specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl substituted phenol.

The present invention also reveals a process for synthesizing trans-1,4-polybutadiene in a continuous process which comprises continuously charging 1,3-butadiene monomer, an organocobalt compound, an organoaluminum compound, a para-substituted phenol, at least one molecular weight regulator selected from the group consisting of dialkyl sulfoxides, diaryl sulfoxides and dialkaryl sulfoxides, and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

DETAILED DESCRIPTION OF THE INVENTION

The polymerizations of the present invention will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent 1,3-butadiene monomer in the polymerization medium.

Such polymerization media are, of course, comprised of the organic solvent and 1,3-butadiene monomer. In most cases, it will be preferred for the polymerization medium to contain from 10 to 25 weight percent monomer. It is generally more preferred for the polymerization medium to contain 15 to 20 weight percent 1,3-butadiene monomer.

It has been found that the microstructure of the TPBD varies with the monomer concentration utilized in its synthesis. Lower monomer concentrations in the polymerization medium result in higher trans contents. As the concentration of 1,3-butadiene monomer in the polymerization medium is increased, the level of trans-1,4 structure decreases. For instance, at a 1,3-butadiene monomer concentration of 5 weight percent, trans contents of about 84% are typical. At monomer concentrations of 17%, trans contents of about 80% are typical. In cases where the polymerization medium contains about 30 weight percent monomer, TPBD having a trans content of only about 68% is generally produced.

Such polymerizations can be carried out utilizing batch, semi-continuous, or continuous techniques. In a continuous process additional 1,3-butadiene monomer, catalyst, and solvent are continuously added to the reaction zone (reaction vessel). The polymerization temperature utilized will typically be within the range of about 20° C. to about 125° C. It is normally preferred for the polymerization medium to be maintained at a temperature which is within the range of about 65° C. to about 95° C. throughout the polymerization. It is typically most preferred for the polymerization temperature to be within the range of about 70° C. to about 90° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. In commercial operations, conversions in excess of about 80% will normally be attained. The polymerization can then be terminated using a standard procedure.

The organocobalt compounds utilized in the catalyst systems of this invention are typically cobalt salts or cobalt containing organic acids which contain from 1 to about 20 carbon atoms. Some representative examples of suitable organocobalt compounds include cobalt benzoate, cobalt acetate, cobalt naphthenate, cobalt octanoate, cobalt neodecanoate, bis($\alpha$-furyl dioxime) cobalt, cobalt palmitate, cobalt stearate, cobalt acetylacetonate, cobalt salicaldehyde, bis(cyclopentadiene) cobalt, cyclopentadienyl-cobalt nitrosyl, bis($\pi$-allyl cobalt), and cobalt tetracarbonyl. Cobalt naphthenate, cobalt octanoate, and cobalt neodecanoate are highly preferred organocobalt compounds. Cobalt 2-ethylhexanoate, which is commonly referred to as cobalt octanoate, Co(Oct)$_2$, is the organocobalt compound which is most commonly used due to economic factors.

The organoaluminum compounds that can be utilized typically have the structural formula:

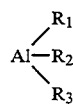

in which $R_1$ is selected from the group consisting of alkyl groups (including cycloalkyl), aryl groups, alkaryl groups, arylalkyl groups, alkoxy groups, and hydrogen; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H). Halogens, such as fluorine, chlorine, bromine and iodine, and halogen containing compounds have been found to be poisons and are detrimental to the polymerizations of this invention. The polymerizations of this invention will accordingly be conducted in the absence of significant quantities of halogens and halogen containing compounds.

The para-alkyl substituted phenols which can be utilized generally have the structural formula:

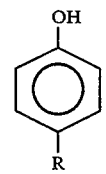

wherein R is an alkyl group which contains from about 6 to about 20 carbon atoms. Such para-alkyl substituted phenols accordingly contain from about 12 to about 26 carbon atoms. In most cases the alkyl group in the para-alkyl substituted phenol will contain from about 8 to about 18 carbon atoms. Such para-alkyl substituted phenols contain from about 14 to about 24 carbon atoms. It is typically preferred for the alkyl group in the para-alkyl substituted phenol to contain from about 9 to about 14 carbon atoms. Such para-alkyl substituted phenols contain from about 15 to about 20 carbon atoms. Exceptionally good results can be attained utilizing para-alkyl substituted phenols having alkyl groups which contain 12 carbon atoms. These highly preferred para-alkyl substituted phenols contain 18 carbon atoms. The polymerizations of this invention are initiated by charging the catalyst components into the polymerization medium. The amount of organocobalt compound utilized will typically be within the range of about 0.01 phm to about 0.5 phm (parts per hundred parts of 1,3-butadiene monomer). It is generally preferred for the organocobalt compound to be employed at a level which is within the range of about 0.05 phm to about 0.3 phm. It is generally more preferred for the organocobalt compound to be utilized in an amount within the range of about 0.15 phm to about 0.25 phm. The organocobalt compound can be charged directly into the polymerization medium containing the 1,3-butadiene monomer.

The organoaluminum compound will be employed in an amount sufficient to attain a molar ratio of the organoaluminum compound to the organocobalt compound which is within the range of about 1 to about 40. It is typically preferred for the molar ratio of the organoaluminum compound to the organocobalt compound to be within the range of about 2 to about 20. It is more preferred for the ratio of the organoaluminum compound to the organocobalt compound to be within the range of about 4 to about 8.

It is highly preferred for the para-alkyl substituted phenol to be "prereacted" with the organoaluminum compound prior to charging it into the polymerization medium. This can be accomplished by simply mixing the para-alkyl substituted phenol with the organoaluminum compound prior to their introduction into the reaction zone. The molar ratio of the para-alkyl substituted phenol to the organoaluminum compound will typically be within the range of about 2 to about 3. It is generally preferred for the molar ratio of the para-alkyl substituted phenol to the organoaluminum compound to be within the range of about 2.25 to about 2.75. It is generally most preferred for the ratio of the para-alkyl substituted phenol to the organoaluminum compound to be within the range of about 2.4 to about 2.6.

The carbon disulfide can be introduced into the polymerization medium as a separate component in cases where it is employed as a gel inhibitor or it can be premixed with the monomer and solvent prior to initiating the polymerization. In other words, the carbon disulfide can be added "in situ" to the reaction zone by charging it separately from the other components. In most cases, the organocobalt compound will also be added to the polymerization medium as a separate component.

The molar ratio of the carbon disulfide to the organocobalt compound will generally be within the range of about 0.05 to about 1. Molar ratios of carbon disulfide to the organocobalt compound less than 0.05:1 may not be effective to inhibit gel formation. Molar ratios of carbon disulfide to the organocobalt compound of greater than 1:1 reduce conversions (yields) significantly. As a general rule, it will be preferred for the molar ratio of carbon disulfide to the organocobalt compound to be within the range of about 0.1 to about 0.5. It is typically more preferred for the molar ratio of carbon disulfide to the organocobalt compound to be within the range of about 0.2 to about 0.3.

In the practice of this invention, at least one dialkyl sulfoxide, diaryl sulfoxide or dialkaryl sulfoxide will be included in the polymerization medium as a molecular weight regulator. The molecular weight of the TPBD produced decreases with increasing levels of the sulfoxide molecular weight regulator present during the polymerization. As a general rule, the molar ratio of the sulfoxide molecular weight regulator to the organocobalt compound will be within the range of about 0.05:1 to about 10:1. However, to attain a significant reduction in molecular weight, the molar ratio of the sulfoxide to the organocobalt compound will normally be greater than 0.1:1. On the other hand, polymer yields suffer when the molar ratio of the sulfoxide to the organocobalt compound is greater than 1:1. For this reason, the molar ratio of the sulfoxide to the organocobalt compound will generally be less than about 5:1. Typically, the molar ratio of the sulfoxide to the organocobalt compound will be within the range of 0.25:1 to 5:1. The molar ratio of the sulfoxide molecular weight regulator to the organocobalt compound will more typically be within the range of 0.5:1 to 3:2.

The sulfoxides which can be employed as molecular weight regulators can be dialkyl sulfoxides, diaryl sulfoxides or dialkaryl sulfoxides. These compounds have the general structural formula:

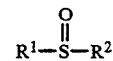

wherein $R^1$ and $R^2$ can be the same or different and are selected from alkyl groups, aryl groups and alkaryl groups. $R^1$ and $R^2$ generally contain from 1 to about 12 carbon atoms. $R^1$ and $R^2$ will more typically contain from 1 to about 6 carbon atoms.

Some representative examples of dialkyl sulfoxides which can be used include dimethyl sulfoxide (DMSO), diethyl sulfoxide, dipropyl sulfoxide and dibutyl sulfoxide. Diphenyl sulfoxide is an example of a diaryl sulfoxide which can be employed as the molecular weight regulator. Some representative examples of dialkaryl sulfoxides which can be utilized include di-3-phenylpropyl sulfoxide, di-phenylmethyl sulfoxide and di-para-methylphenyl sulfoxide.

In the TPBD produced by the process of this invention, at least about 65% of the butadiene repeat units in the polymer are of the trans-1,4-isomeric structure. The TPBD made utilizing the catalyst system of this invention typically has a trans-isomer content of at least about 70%. In most cases the TPBD made by the process of this invention will have a trans-isomer content which is within the range of about 75% to about 85%.

The polymerizations of this invention result in the formation of solutions containing the TPBD. Standard techniques can be utilized to recover the TPBD from the solution in which it is dissolved. Coagulation techniques will typically be employed to recover the TPBD from the organic solvent. Such coagulation procedures typically involve the addition of an alcohol or ketone to the TPBD solution to induce coagulation. However, the TPBD can also be recovered from the organic solvent by evaporation procedures, such as steam stripping. Such evaporation procedures typically involve heating the polymer solution to a slightly elevated temperature in conjunction with the application of vacuum.

The TPBD made utilizing the techniques of this invention is a thermoplastic resin. It can be molded into various useful articles. Because the TPBD contains many double bonds in its backbone, it can also be blended and cocured with rubbers. Despite the fact that TPBD of this invention is a thermoplastic resin, it becomes elastomeric when cured alone or when cocured with one or more rubbers. TPBD has the ability to strain crystallize which improves properties, such as tensile strength, tear strength and flex fatigue. It can accordingly be used in manufacturing rubber articles such as hoses, belts and tires which have improved performance characteristics.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, TPBD was synthesized utilizing the techniques of this invention. In the procedure used, dimethyl sulfoxide was employed as the molecular weight regulator. The catalyst system employed included 0.20 phm of cobalt octanoate. The catalyst system also contained triisobutyl aluminum which had been prereacted with 2.5 moles of para-dodecylphenol. The molar ratio of the triisobutyl aluminum to the cobalt octanoate was 6:1. The dimethyl sulfoxide molecular weight regulator was utilized in this experiment at a molar ratio to the cobalt octanoate of 1:1. The polymerization was conducted in an 8-ounce (237 ml) polymerization bottle which was rotated end-over-end for 90 minutes in a water bath which was maintained at a temperature of about 65° C. The TPBD produced was determined to have a dilute solution viscosity (DSV) of 2.71 with a polymeric yield of 84 percent being attained.

COMPARATIVE EXAMPLE 2

In this experiment, the same procedure described in Example 1 was employed, except for the fact that no molecular weight regulator was included in the polymerization medium. The TPBD produced had a dilute solution viscosity of 3.97 with a polymer yield of 89 percent being attained. This comparative example shows that the dilute solution viscosity, and accordingly the molecular weight, of the TPBD produced was much higher in cases where the polymerization was conducted in the absence of a sulfoxide molecular weight regulator.

EXAMPLES 3-7

In this series of experiments, TPBD was prepared in the presence of various amounts of dimethyl sulfoxide as a molecular weight regulator. The amount of dimethyl sulfoxide utilized in each experiment as a molar ratio to the amount of cobalt octanoate employed is reported in Table 1.

These polymerizations were carried out utilizing 500 ml 1,3-butadiene in hexane premix solutions. The polymerizations were carried out in 32-ounce (0.946 liter) polymerization bottles. Triisobutyl aluminum, which was previously modified with 2.5 moles of p-dodecylphenol (i-Bu$_3$Al*2.5DP), was employed as a 0.37 M solution in hexane. Cobalt octanoate, Co(Oct)$_2$, was used as a 0.05 M solution in hexane, and dimethyl sulfoxide (DMSO) was used as a 0.10 solution in premix.

The premix solution was added to the polymerization bottles followed by DMSO, 6.0 ml of the triisobutyl aluminum solution and 7.5 ml of the cobalt octanoate solution. The cobalt octanoate was present at a level of 0.26 phm (parts per 100 parts of monomer). In this series of experiments, the ratio of the triisobutyl aluminum compound to the cobalt octanoate was 6:1.

The polymerization bottle was placed in a water bath which was maintained at a temperature of 65° C. and was rotated end-over-end for 90 minutes. The polymerization was short-stopped by the addition of a solution which was added to give 1.0 phm isopropyl alcohol and 1.0 phm N-phenyl-N'-(1,3-dimethylbutyl)-pphenylenediamine (Santoflex® 13 stabilizer). Polymer was isolated by oven-drying. Polymer DSV was determined on 0.25 percent solutions in toluene at 30° C.

TABLE 1

| Ex. # | DMSO/Co | Yield (%) | DSV (dl/g) | Mn | Mw | Mw/Mn |
|---|---|---|---|---|---|---|
| 3 | 0 | 94 | 3.68 | 371,000 | 830,000 | 2.24 |
| 4 | 1.07 | 94 | 2.75 | 215,000 | 452,000 | 2.11 |
| 5 | 2.13 | 91 | 2.30 | 159,000 | 337,000 | 2.14 |
| 6 | 3.20 | 83 | 1.92 | 141,000 | 289,000 | 2.05 |
| 7 | 4.27 | 62 | 1.64 | 110,000 | 213,000 | 1.93 |

In Table 1 above, Mn represents the number average molecular weight and Mw represents the weight average molecular weight of the TPBD. Mw/Mn is the ratio of the weight average molecular weight to the number average molecular weight of the TPBD.

EXAMPLES 8-25

This series of polymerizations was carried out using 4-ounce (118 ml) polymerization bottles which contained premix solutions of 15.5 percent 1,3butadiene in hexane which contained 20 ppm carbon disulfide. Triethylaluminum, which was previously modified with 2.5 moles of p-dodecylphenol (Et$_3$Al*2.5DP), was used as the carrier for DMSO, i.e., DMSO was added to the triethylaluminum solution at the level required to give the desired ratio of DMSO to cobalt octanoate (DMSO/Co). This triethylaluminum solution was employed as 0.30 M solution in hexane. The molar ratio of triisobutylaluminum to cobalt octanoate is shown as Al/Co in Table 2.

In the experimental procedure employed, the premix solutions were added to the polymerization bottles followed by the addition of the triethylaluminum which had been modified with p-dodecylphenol, the DMSO and Co(Oct)$_2$. The polymerizations were then carried out using the same procedure as was employed in Examples 3–7.

TABLE 2

| Ex. # | Co(Oct)$_2$ (phm) | Al/Co | DMSO/Co | Yield (%) | DSV (dl/g) |
|---|---|---|---|---|---|
| 8 | 0.20 | 6.0 | 0 | 88 | 3.86 |
| 9 | 0.20 | 6.0 | 0.30 | 80 | 2.99 |
| 10 | 0.20 | 6.0 | 0.60 | 76 | 2.94 |
| 11 | 0.20 | 6.0 | 0.90 | 72 | 2.57 |
| 12 | 0.20 | 6.0 | 1.20 | 67 | 2.17 |
| 13 | 0.20 | 6.0 | 1.50 | 63 | 2.20 |
| 14 | 0.30 | 6.0 | 0 | 91 | 2.97 |
| 15 | 0.30 | 6.0 | 0.30 | 92 | 2.34 |
| 16 | 0.30 | 6.0 | 0.60 | 93 | 2.29 |
| 17 | 0.30 | 6.0 | 0.90 | 91 | 2.13 |
| 18 | 0.30 | 6.0 | 1.20 | 88 | 2.01 |
| 19 | 0.30 | 6.0 | 1.50 | 84 | 1.86 |
| 20 | 0.30 | 8.0 | 0 | 93 | 2.71 |
| 21 | 0.30 | 8.0 | 0.40 | 100 | 2.25 |
| 22 | 0.30 | 8.0 | 0.80 | 98 | 2.06 |
| 23 | 0.30 | 8.0 | 1.20 | 94 | 2.04 |
| 24 | 0.30 | 8.0 | 1.60 | 90 | 1.79 |
| 25 | 0.30 | 8.0 | 2.00 | 86 | 1.72 |

EXAMPLES 26-35

In this series of experiments 1,3-butadiene was polymerized into TPBD in the presence of increasing levels of dibutyl sulfoxide (DBSO). Examples 26 and 27 were run as controls with no DBSO being present in the polymerization medium. The amount of DBSO employed in Examples 28-35 as a molar ratio to the amount of cobalt octanoate employed is shown in Table 3.

These polymerizations were conducted in 8-ounce (237 ml) polymerization bottles. In the procedure used 200 ml of a 16% premix solution of 1,3-butadiene in hexane was added to each of the bottles followed by the addition of 1.2 ml of a 0.05 M cobalt octanoate 10 solution, 1.60 ml of a 0.22 M triisobutyl aluminum solution which was previously modified with 2.5 moles of p-dodecylphenol, and various amounts of a 0.05 M solution of DBSO in hexane. The polymerization bottles were placed in a water bath which was maintained at a temperature of 65° C. and were rotated end-over-end for 90 minutes. The polymerizations were short-stopped by the addition of a solution which was added to provide 1.0 phm of isopropyl alcohol and 1.0 phm of butylated hydroxytoluene (BHT). Polymer was isolated by oven-drying. Polymer dilute solution viscosity (DSV) was determined on 0.25 percent solutions in toluene at 30° C. The polymer yield and DSV of the TPBD polymers produced is shown in Table 3.

TABLE 3

| Example | DBSO/Co | Yield (%) | DSV (dl/g) |
|---|---|---|---|
| 26 | 0 | 95 | 5.93 |
| 27 | 0 | 95 | 5.96 |
| 28 | 0.5 | 93 | 5.48 |
| 29 | 1.0 | 92 | 4.25 |
| 30 | 1.5 | 91 | 4.18 |
| 31 | 2.0 | 86 | 3.68 |
| 32 | 2.5 | 81 | 3.64 |
| 33 | 3.0 | 76 | 3.30 |
| 34 | 3.5 | 69 | 3.17 |
| 35 | 4.0 | 59 | 2.96 |

This series of experiments shows that dibutyl sulfoxide is a very effective molecular weight regulator for use in the synthesis of TPBD with catalyst systems which are comprised of an organocobalt compound, an organoaluminum compound, and a para-substituted phenol. As can be seen the molecular weight of the TPBD produced decreases with increasing levels of the dibutyl sulfoxide. This series of experiments also shows that a molar ratio of DBSO to the organocobalt compound of up to 1.5:1 can be employed with polymer yields still being greater than 90%.

EXAMPLES 36–40

This series of experiments was conducted utilizing the same procedures as was employed in Examples 26–35 except for the fact that diphenyl sulfoxide (DPSO) was employed as the molecular weight regulator. Example 26 was run as a control in which the polymerization was carried out in the absence of any molecular weight regulator.

TABLE 4

| Example | DPSO/Co | Yield (%) | DSV (dl/g) |
|---|---|---|---|
| 36 | 0 | 82 | 5.95 |
| 37 | 0.5 | 86 | 5.24 |
| 38 | 1.0 | 89 | 4.47 |
| 39 | 1.5 | 87 | 4.40 |
| 40 | 2.0 | 74 | 4.32 |

These experiments show that diphenyl sulfoxide is an excellent molecular weight regulator which can be employed in the synthesis of TPBD. The molecular weight of the polymer produced decreases with increasing levels of diphenyl sulfoxide present.

While certain representative embodiments and details have been shown for the purpose of illustrating the present invention, it will be apparent to those skilled in this art that various changes and modifications can be made therein without departing from the scope of the present invention.

What is claimed is:

1. A process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which consists essentially of an organocobalt compound, an organoaluminum compound, and a para-alkyl substituted phenol; wherein the organoaluminum compound is of the structural formula:

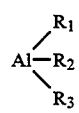

wherein $R_1$ is selected from the group consisting of alkyl groups, aryl groups, alkaryl selected from the group consisting of alkyl groups, aryl groups, alkaryl groups, and arylalkyl groups.

2. A process for synthesizing trans-1,4-polybutadiene in a continuous process which consists essentially of continuously charging 1,3-butadiene monomer, an organocobalt compound, an organoaluminum compound, a para-substituted phenol, at least one molecular weight regulator selected from the group consisting of dialkyl sulfoxides, diaryl sulfoxides and dialkaryl sulfoxides, and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone; wherein the organoaluminum compound is of the structural formula:

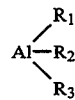

wherein $R_1$ is selected from the group consisting of alkyl groups, aryl groups, alkaryl groups, arylalkyl groups, alkoxy groups, and hydrogen; and wherein $R_2$ and $R_3$ are selected from the group consisting of alkyl groups, aryl groups, alkaryl groups, and arylalkyl groups.

3. A process as specified in claim 2 which further comprises continuously charging carbon disulfide into the reaction zone.

4. A process as specified in claim 3 wherein the 1,3-butadiene monomer in the reaction zone is at a concentration which is within the range of about 5% to about 30%, based upon the total weight of the 1,3-butadiene monomer and organic solvent in the reaction zone; and wherein the temperature in the reaction zone is within the range of about 20° C. to about 125° C.

5. A process as specified in claim 3 wherein the organocobalt compound is present at a level which is within the range of about 0.01 phm to about 0.5 phm.

6. A process as specified in claim 3 wherein the organocobalt compound is present at a level which is within the range of about 0.05 phm to about 0.3 phm.

7. A process as specified in claim 3 wherein the organocobalt compound is present at a level which is within the range of about 0.15 phm to about 0.25 phm.

8. A process as specified in claim 3 wherein the 1,3-butadiene monomer is polymerized at a temperature which is within the range of about 65° C. to about 95° C.

9. A process as specified in claim 3 wherein the 1,3-butadiene monomer in the reaction zone is at a concentration which is within the range of about 10% to about 25%, based upon the total weight of the 1,3-butadiene monomer and organic solvent in the reaction zone.

10. A process as specified in claim 3 wherein the 1,3-butadiene monomer in the reaction zone is at a concentration which is within the range of about 15% to about 20%, based upon the total weight of the 1,3-butadiene monomer and organic solvent in the reaction zone.

11. A process as specified in claim 3 wherein the paraoalkyl substituted phenol contains from about 15 to about 20 carbon atoms.

12. A process as specified in claim 6 wherein the molar ratio of the para-alkyl substituted phenol to the organoaluminum compound is within the range of about 2.25 to about 2.75; wherein the molar ratio of the carbon disulfide to the organocobalt compound is within the range of about 0.1 to about 0.5; and wherein the molar ratio of the organoaluminum compound to the organocobalt compound is within the range of about 2 to about 20.

13. A process as specified in claim 12 wherein the para-alkyl substituted phenol is para-dodecylphenol.

14. A process as specified in claim 1 wherein said sulfoxide compound is a dialkyl sulfoxide.

15. A process as specified in claim 14 wherein said dialkyl sulfoxide is selected from the group consisting of dimethyl sulfoxide, diethyl sulfoxide, dipropyl sulfoxide and dibutyl sulfoxide.

16. A process as specified in claim 1 wherein said sulfoxide compound is dimethyl sulfoxide.

17. A process as specified in claim 1 wherein said sulfoxide compound is dibutyl sulfoxide.

18. A process as specified in claim 1 wherein the sulfoxide compound is diphenyl sulfoxide.

19. A process as specified in claim 1 wherein the molar ratio of the sulfoxide compound to the organocobalt compound is within the range of about 0.05:1 to about 10:1.

20. A process as specified in claim 1 wherein the molar ratio of the sulfoxide compound to the organocobalt compound is within the range of about 0.1:1 to about 5:1.

21. A process as specified in claim 1 wherein the molar ratio of the sulfoxide compound to the organocobalt compound is within the range of about 0.25:1 to about 5:1.

22. A process as specified in claim 1 wherein the molar ratio of the sulfoxide compound to the organocobalt compound is within the range of about 0.5:1 to about 3:2.

* * * * *